United States Patent [19]

Hwang

[11] Patent Number: 4,858,168

[45] Date of Patent: Aug. 15, 1989

[54] CARRY LOOK-AHEAD TECHNIQUE HAVING A REDUCED NUMBER OF LOGIC LEVELS

[75] Inventor: InSeok S. Hwang, Lower Macungie Township, Pa.

[73] Assignee: American Telephone and Telegraph Company, Murray Hill, N.J.

[21] Appl. No.: 157,187

[22] Filed: Feb. 16, 1988

[51] Int. Cl.[4] .............................................. G06F 7/50
[52] U.S. Cl. ................................................. 364/787
[58] Field of Search ....................... 364/787, 786, 784; 307/472

[56] References Cited

U.S. PATENT DOCUMENTS 3,993,891 11/1976 Beck et al. ........................... 364/787
4,584,661 4/1986 Grundland ............................ 364/787
4,623,981 11/1986 Wolrich et al. .................. 364/787 X
4,764,886 8/1988 Yano .................................... 364/787

FOREIGN PATENT DOCUMENTS 55-104135 9/1980 Japan .

OTHER PUBLICATIONS

ISSCC'88, Session XI: "High-Speed Logic"; Tham 11.2: A 3.1ns 32b CMOS Adder in Multiple Output Domino Logic, Hwang et al., pp. 140–141, 332–333.
"High-Speed Compact Circuits with CMOS", IEEE Journal of Solid-State Circuits, vol. SC–17, No. 3, June 1982, pp. 614–619, Krambeck et al.
"Digital Computer Arithmetic Design and Implementation," Cavanagh, University of Santa Clara, McGraw-Hill, 1984, pp. 107–117.

Primary Examiner—Gary V. Harkcom
Assistant Examiner—Tan V. Mai
Attorney, Agent, or Firm—James H. Fox

[57] ABSTRACT

A 32-bit adder utilizes an optimal partitioning scheme for improving the 32-bit carry look-ahead. Instead of relying on the powers-of-four partitioning scheme used in prior art adders, the inventive technique uses "double generate" and "double propagate" terms. These represent the generate and propagate functions for two bits. In addition, "double group geneate" and "double group propagate" terms are produced, which represent the generate and propagate terms for a 8-bit groups. In this manner, a partition of 1-bit/8-bit is obtained, rather than the prior art 1-bit/4-bit/16-bit. The critical path is typically shortened from 7 logic levels to 5 logic levels, resulting in faster operation. The double functions are advantageously implemented using logic circuitry having two (or more) outputs per gate.

6 Claims, 8 Drawing Sheets

The organization of the 32-bit CLA adder

FIG. 1

The organization of the 32-bit CLA adder

FIG. 2  DETAILED G/DG/P/DP/S UNIT

FIG. 4   NODL GATE: SINGLE AND DOUBLE BIT GENERATE TERMS

FIG. 5  MODL GATE: SINGLE AND DOUBLE BIT PROPAGATE TERMS

FIG.6 MODL GATE: SINGLE AND DOUBLE GROUP GENERATE TERMS

FIG. 7   MODL GATE: SINGLE AND DOUBLE GROUP PROPAGATE TERMS

FIG. 8

CARRY LOOK-AHEAD TECHNIQUE HAVING A REDUCED NUMBER OF LOGIC LEVELS

BACKGROUND OF THE INVENTION

1. Field of the Invention

The present invention relates to an improved carry look-ahead technique, used, for example, in an adder.

2. Description of the Prior Art

Carry look-ahead (CLA) is the predominant technique for high performance adders used in microprocessors, digital signal processors, and other integrated circuits. An overview of carry look-ahead adder theory is given in *Digital Computer Arithmetic*, by J. J. F. Cavanagh, p. 107–117, McGraw-Hill (1984). To save computation time, a CLA computes the carry inputs to all of the bit adder stages in parallel (i.e., simultaneously). For this purpose, two auxiliary signals, the "generate" and the "propagate" are produced. The generate (G) signal is a logic "1" when a carry is generated at a given state (and "0" otherwise); and the propagate (P) signal is a logic "1" when a given stage will pass (i.e., propagate) the incoming carry to the next higher stage (and "0" if it will not). The G and P signals are then combined in logic circuitry to produce the bit carries. For example, when adding 64 bit numbers, it is theoretically possible that 64 G signals and 64 P signals may be combined to produce 64 bit carries in the same logic level. However, the fan-in limitations of most integrated circuit technologies prevents the carry generating circuitry from accepting all 64 G and 64 P signals simultaneously. In most technologies, the optimal fan-in limitation of the circuit prevents more than 4 pairs of terms from being combined in a given circuit. Therefore, the G and P signals are combined in groups of 4 (or less). The outputs of these groups are then combined at higher levels to achieve the final bit carries.

This division of the total number of stages into groups is referred to as "partitioning". In order to achieve maximum circuit speed, it is necessary to reduce the number of logic levels used to generate the bit carry signals. Hence, it is desirable that each group receives the maximum possible number of inputs, without exceeding the fan-in limit. In that manner, the delay time, being proportional to the number of logic levels required to produce the bit carries, is minimized. For example, when adding two 64 bit numbers, the typical partitioning scheme provides for four "sections" with four "groups" per section, and four bits per group. This partitioning scheme is then referred to as a "1 bit/4 bit/16 bit" partition. In the first level, G and P terms are produced for each bit position; in the second level, 4 G and 4 P terms are combined to produce 4 group generate (GG) and 4 group propagate (GP) terms; in the third level, 4 GG and 4 GP terms are combined to produce 3 section carry (SC) terms and the carry-out term. The carry-in term and the 3 SC terms are combined with the GG and GP terms to produce the group carry (GC) terms. The GC terms are combined with the G and P terms to produce the bit carries. It can thus be seen that for carry look-ahead adders whose data path width is an integral power of 4 (e.g., $64 = 4^3$), the prior art partitioning scheme combines 4 bits for producing terms at each level.

However, for adders whose data path width is not a power of 4, (for example, 32 bit wide data paths), the prior partitioning scheme has been retained. That is, microprocessors and other types of ICs that utilize 32 bit data paths have used the above-described partitioning scheme, which was developed originally for computer main-frame technologies using 16 or 64 bit data paths.

SUMMARY OF THE INVENTION

I have invented a carry look-ahead technique, wherein the partitioning scheme is 2 bit/8 bit. That is, the first level produces "double generate" (DG) and "double propagate" (DP) terms representing 2-bit wide generate and propagate terms. The second level combines 4 DG and 4 DP terms to produce "double group generate" (DGG) and "double group propagate" (DGP) terms. In a preferred embodiment, this is achieved using logic circuitry implementing multiple functions and having multiple outputs per gate.

DETAILED DESCRIPTION

Figure 1:
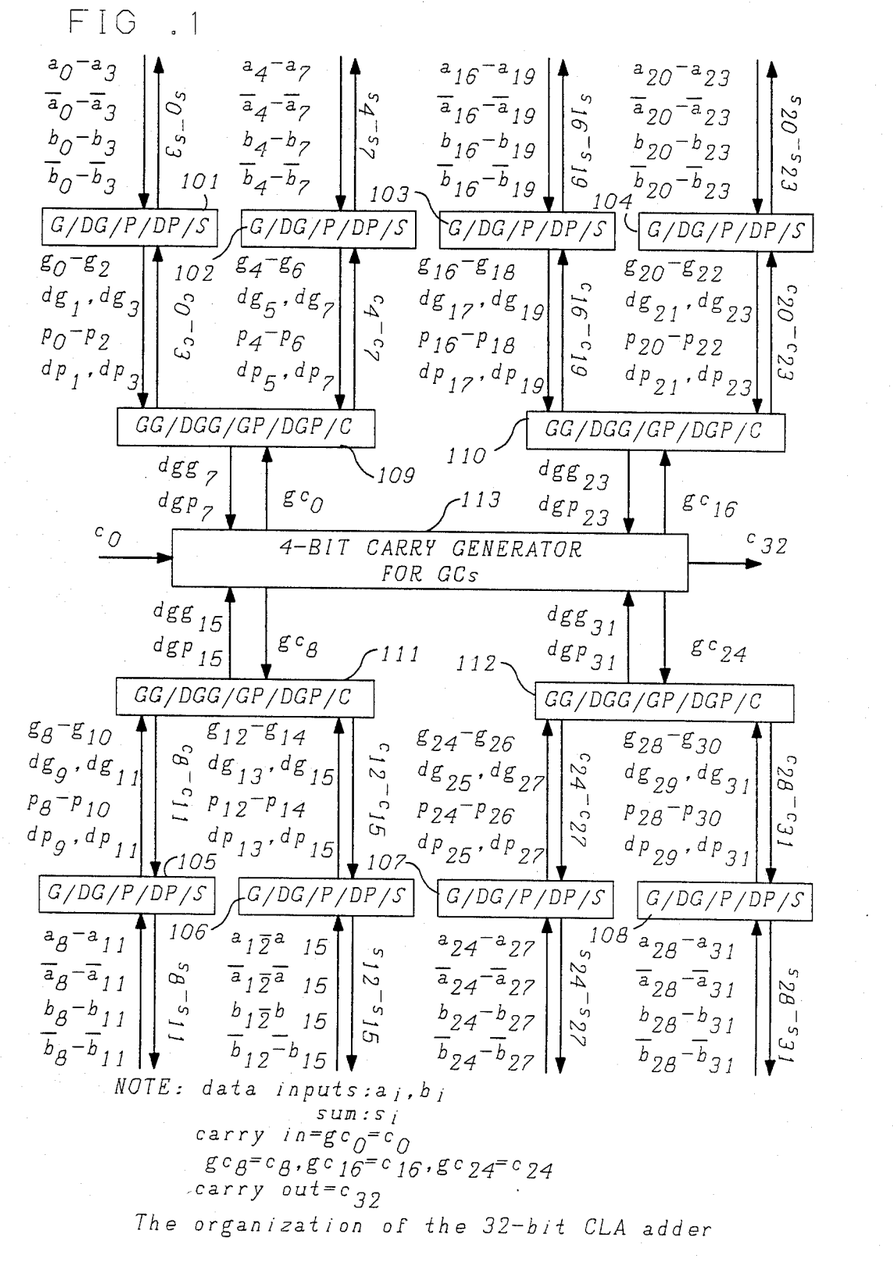
FIG. 1 shows a block diagram of the inventive 32 bit carry look-ahead adder organization.

The following detailed description relates to a 32 bit carry look-ahead adder having an improved organization. The invention provides for a partitioning scheme that reduces the number of gate delays as compared to a conventional partitioning scheme. Referring to FIG. 1, the units 101 . . . 113 are labelled according to their functions in capital letters, with small letters referring to the input and output terms. In the present implementation, the data input bits ($a_0$ . . . $a_{31}$ and $b_0$ . . . $b_{31}$) and their complements are supplied in groups of four to the "G/DG/P/DP/S" units, being the eight units 101 . . . 108. These units each produce generate (G) terms $g_i$, and propagate (P) terms $p_i$, (where i=0, 1, 2 . . . 31), which are terms also generated in prior art adders, as noted above. In addition, these units produce two "double generate" (DG) terms $dg_{i+1}$ and two "double propagate" (DP) terms $dp_{i+1}$, where i=0, 2, 4 . . . 30. It is these double terms that in part distinguish the present technique from prior art techniques. Each of the eight G/DG/P/DP/S units also receives four carry-in terms ($c_0$ . . . $c_{31}$) from the next higher unit (109 . . . 112), discussed below. In addition, each of the eight G/DG/P/DP/S units produces four of the sum (S) bits ($s_0$ . . . $s_{31}$).

Figure 2:
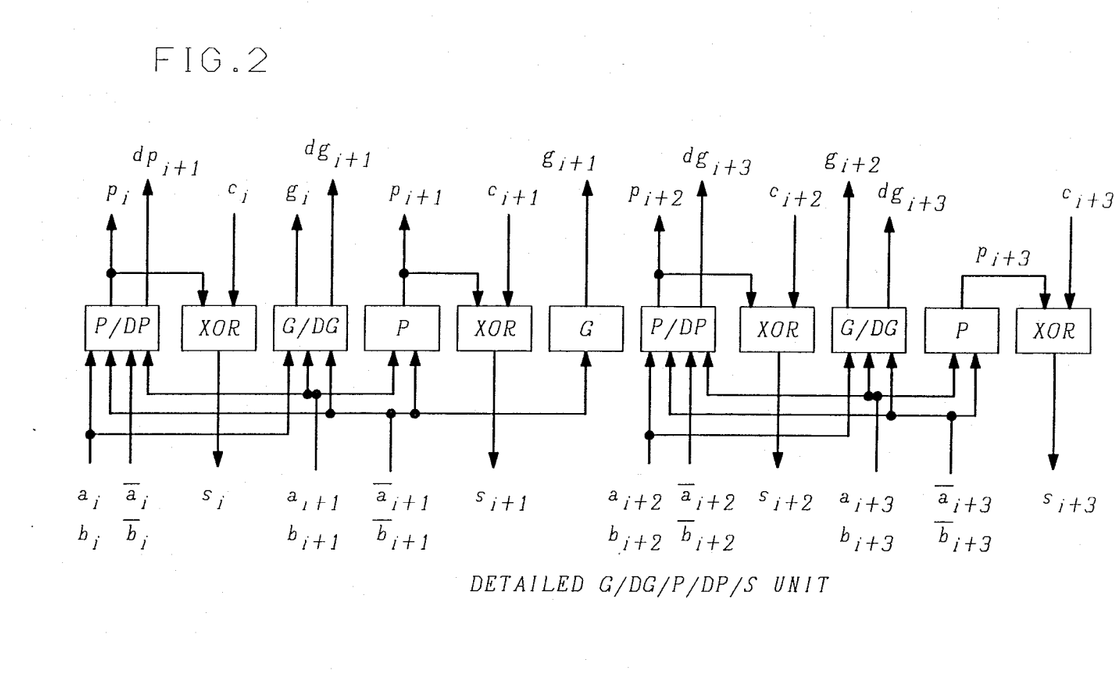
FIG. 2 shows in detail the "G/DG/P/DP/S" unit of FIG. 1.
Figure 4:
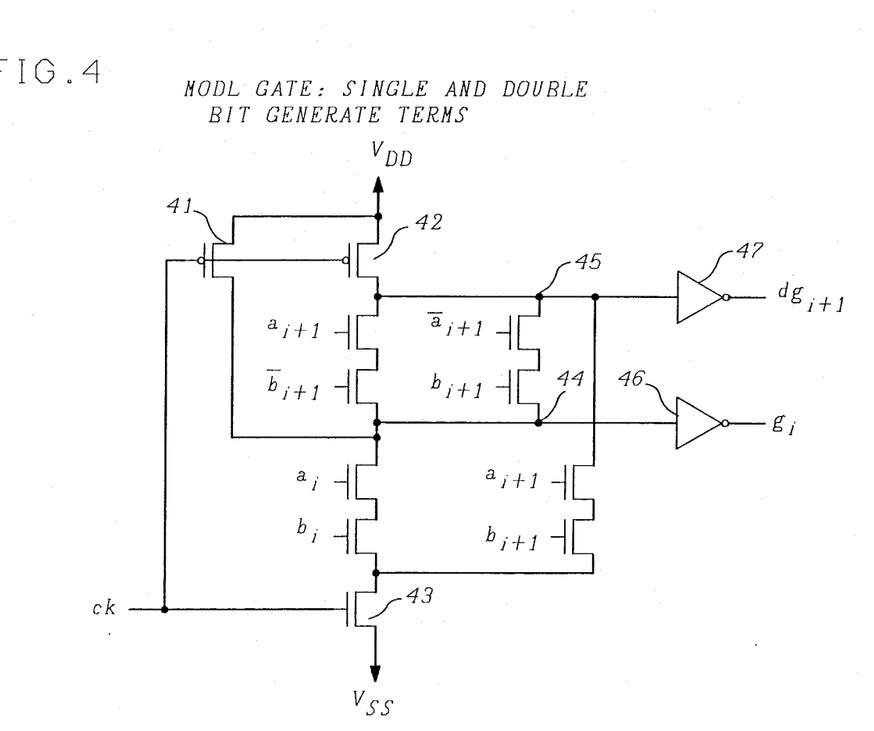
FIG. 4 shows the MODL gate for producing the "generate" ($g_i$) and "double generate" ($dg_{i+1}$) terms.

Referring to FIG. 2, a detailed block diagram of each G/DG/P/DP/S unit is shown. In particular, note that two "G/DG" units are included, being those that produce the "generate" and "double generate" terms ($g_i$ and dg$_{i+1}$ respectively). A presently preferred circuit technique for implementing these terms is shown in FIG. 4. The data input bits a$_i$, a$_{i+1}$ and b$_i$, b$_{i+1}$ (and their complements) are supplied to the gates of the n-channel logic transistors as shown. The p-channel precharge transistors 41 and 42 are conductive when the clock signal "ck" is low, and the n-channel discharge transistor 43 is conductive during the evaluation period, when the clock signal (ck) is high. Note that both the outputs g$_i$ and dg$_{i+1}$ are obtained (through output inverters 46 and 47) from a single logic gate. That is, both the top of the logic string (node 45) and an intermediate node (44) are utilized to generate the two output terms. This type of logic circuitry is referred to herein as "multiple output dynamic logic" (MODL). (Further applications of this type of logic circuitry are described in applicant's co-pending application "Multiple Output Field Effect Transistor Logic", Ser. No. 131,872, coassigned herewith.) As is apparent from an inspection of FIG. 4, this circuitry produces a true "generate" term (g$_i$ logic "1") when (and only when) both a$_i$ and b$_i$ are logic "1". This circuitry also produces a true "double generate" term (dg$_{i+1}$ is a logic "1") when either of the following is true:

(1) both a$_{i+1}$ and b$_{i+1}$ are logic "1" (i.e., true)
(2) both a$_i$ and b$_i$ are logic "1", and either (but not both) of a$_{i+1}$ or b$_{i+1}$ is logic "1".

Figure 5:
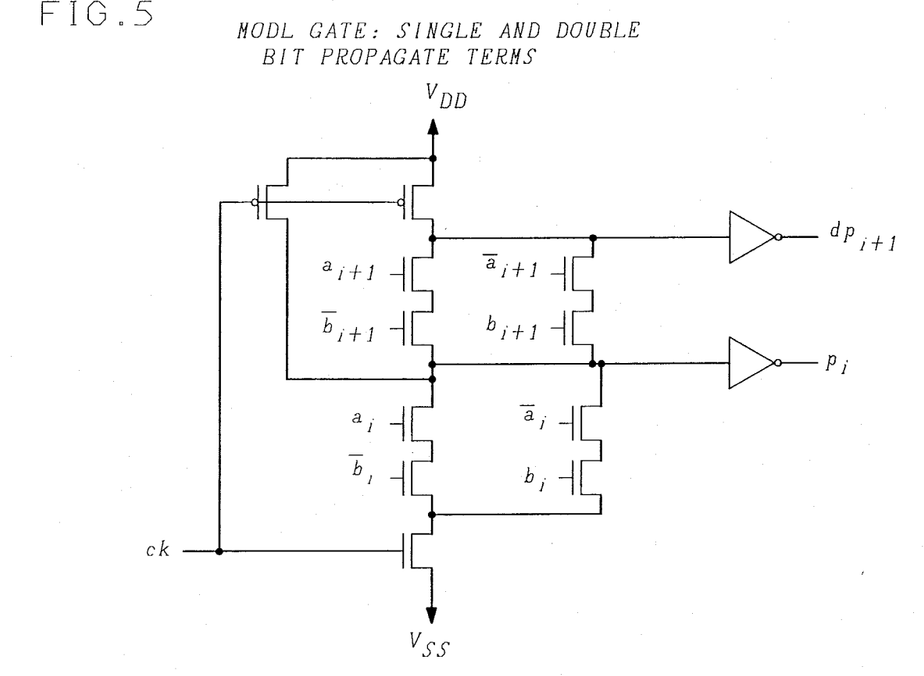
FIG. 5 shows the MODL gate for producing the "propagate" ($p_i$) and "double propagate" ($dp_{i+1}$) terms.

Referring again to FIG. 2, not also that two "P/DP" units are shown, being those that generate the "propagate" and "double propagate" terms. A MODL circuit that produces these terms is shown in FIG. 5, and operates on the inputs shown in an analogous manner as described for FIG. 4. The circuit produces a true "propagate" term (p$_i$ logic "1") when, and only when, either a$_i$ or b$_i$, but not both, is logic "1". The circuit produces a logic "1" (i.e., true) dp$_{i+1}$ output when both of the following are true:

(1) either (but not both) of a$_{i+1}$ or b$_{i+1}$ is logic "1"
(2) either (but not both) of a$_i$ or b$_i$ is logic "1".

FIG. 2 also shows four "exclusive OR" (XOR) functions operating on the indicated input terms, and may be implemented according to circuits known in the art. Finally, note that "generate" (G) and "propagate" (P) functions are also shown, and may be implemented according to prior art circuit techniques, wherein g$_i$=a$_i$ AND b$_i$, and p$_i$=a$_i$ XOR b$_i$.

Figure 3:
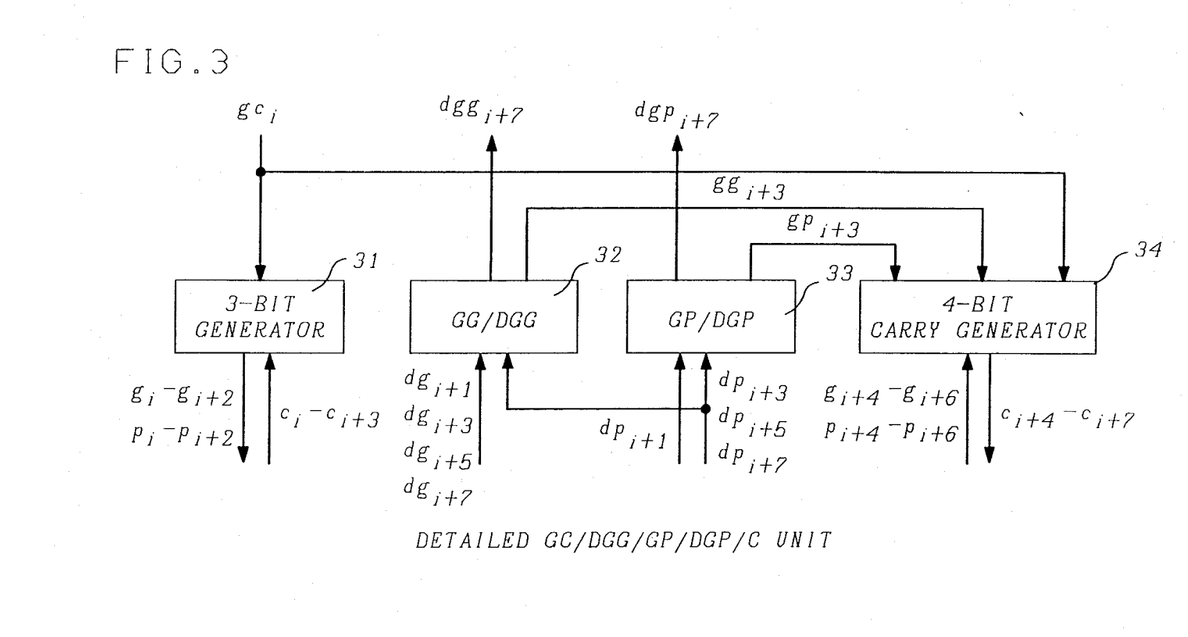
FIG. 3 shows in detail the "GG/DGG/GP/DGP/C" unit of FIG. 1.
Figure 8:
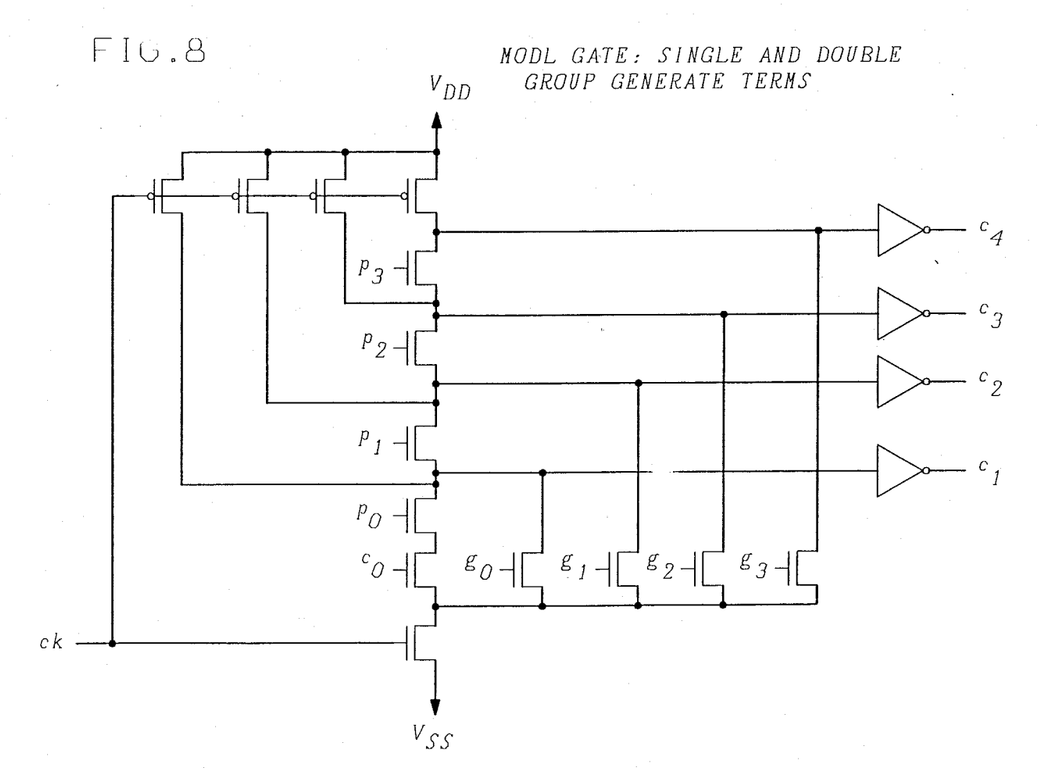
FIG. 8 shows a MODL gate suitable for implementing the 3-bit and 4-bit carry generators of FIGS. 1 and 3.

Referring to FIG. 3, a detailed block diagram of the "GG/DGG/GP/DGP/C" unit is shown. The "3-BIT CARRY GENERATOR" unit (31) receives the "group carry" term gc$_i$, where i=0, 8, 16 and 24, as well as the "generate" g$_i$ and "propagate" p$_i$ terms as inputs. It produces the bit carry terms c$_i$ as outputs. A MODL circuit suitable for implementing this function is shown in FIG. 8, wherein the following input and output terms are substituted for the generalized input and output symbols shown as follows:

$$c_0 = gc_i \quad g_0 = g_i$$
$$g_1 = g_{i+1} \quad g_2 = g_{i+2}$$
$$p_0 = p_i \quad p_1 = p_{i+1}$$
$$p_2 = p_{i+2} \quad c_1 = c_{i+1}$$
$$c_2 = c_{i+2} \quad c_3 = c_{i+3}.$$

Note that the p$_3$ and g$_3$ inputs, the c$_4$ output (and associated transistors) are not used in the circuit realization of unit 31. Furthermore, the gc$_i$ input is also passed through unit 31 without change, producing the c$_i$ output, where i=0, 8, 16 and 24.

Figure 6:
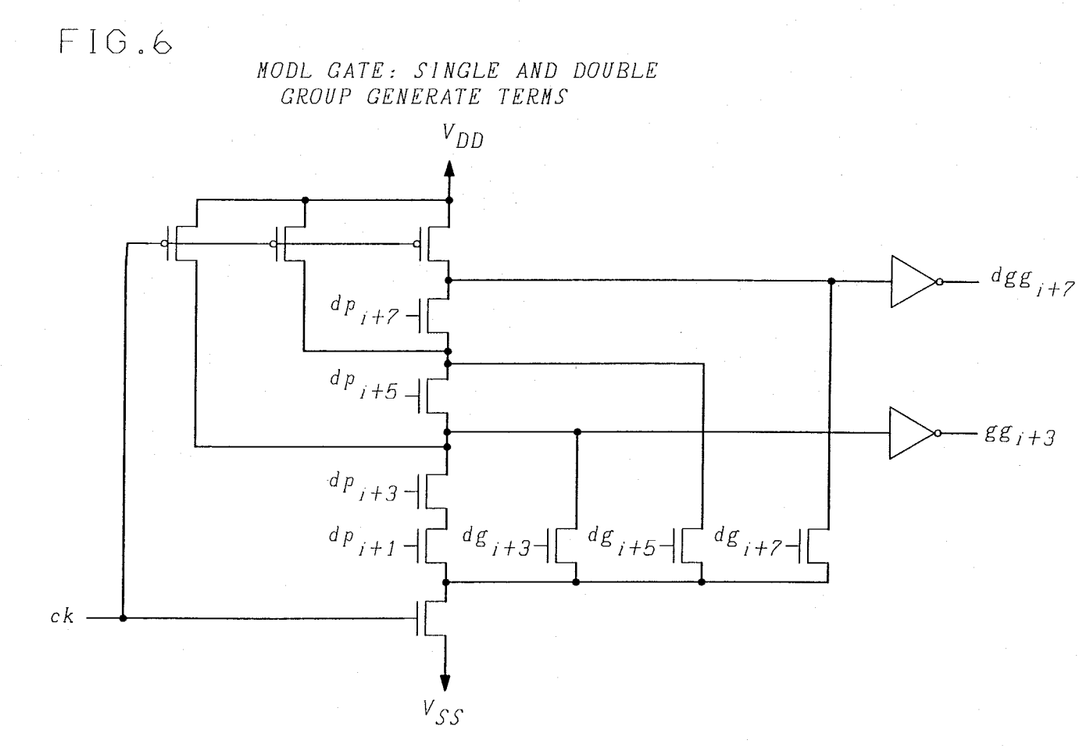
FIG. 6 shows the MODL gate for producing the "group generate" ($gg_{i+3}$) and "double group generate" ($dgg_{i+7}$) terms.

The "GG/DGG" unit (32) of FIG. 3 may be implemented using the MODL circuit shown in FIG. 6 for implementing the "group generate" (gg$_{i+3}$) and "double group generate" (dgg$_{i+7}$) terms. Note that the inputs for that circuit are the "double generate" terms and "double propagate" terms indicated. The circuit of FIG. 6 implements the two functions:

$$gg_{i+3} = dg_{i+3} + dp_{i+3}dg_{i+1}$$

$$dgg_{i+7} = dg_{i+7} + dp_{i+7}(dg_{i+5} + dp_{i+5}(gg_{i+3}))$$
$$= dg_{i+7} + dp_{i+7}(dg_{i+5} + dp_{i+5}(dg_{i+3} + dp_{i+3}dg_{i+1})).$$

Figure 7:
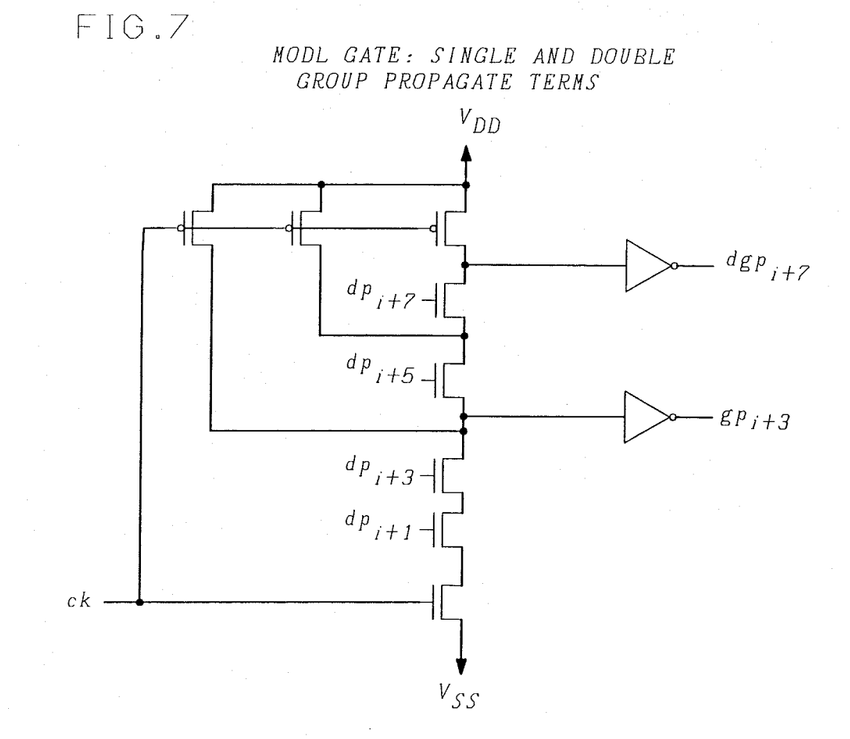
FIG. 7 shows the MODL gate for producing the "group propagate" ($gp_{i+3}$) and "double group propagate" ($dgp_{i+7}$) terms.

The "GP/DGP" unit (33) of FIG. 3 may be implemented using the MODL circuit shown in FIG. 7 for producing the "group propagate" (gp$_{i+3}$) and "double group propagate" (dgp$_{i+7}$) terms. The circuit of FIG. 7 implements the two functions:

$$gp_{i+3} = dp_{i+3}dp_{i+1}$$

$$dgp_{i+7} = dp_{i+7}dp_{i+5}gp_{i+3}$$
$$= dp_{i+7}dp_{i+5}dp_{i+3}dp_{i+1}.$$

Also shown in FIG. 3 is the "4-BIT CARRY GENERATOR" unit (34), which may be implemented using the MODL circuit of FIG. 8 with the following substitutions for the standard input and output symbols shown:

$$c_0 = gc_i$$

$$g_0 = gg_{i+3} \quad g_1 = g_{i+4}$$
$$g_2 = g_{i+5} \quad g_3 = g_{i+6}$$
$$p_0 = gp_{i+3} \quad p_1 = p_{i+4}$$
$$p_2 = p_{i+5} \quad p_3 = p_{i+6}$$
$$c_1 = c_{i+4} \quad c_2 = c_{i+5}$$
$$c_3 = c_{i+6} \quad c_4 = c_{i+7}.$$

Referring again to FIG. 1, the "GG/DGG/GP/DGP/C" units 109 ... 112 supply the "double group generate" terms dgg$_{i+7}$ and "double group propagate" terms dgp$_{i+7}$ (where i=0, 8, 16 and 24) to the 4-bit CARRY GENERATOR unit (113) for producing the three group carry terms gc$_i$, (where i=8, 16 and 24), and the carry-out term. The four-output MODL circuit shown in FIG. 8 may be used for this purpose, wherein the following substitutions are made for the generalized input and output symbols shown:

$$c_0 = gc_0 = \text{carry-in}$$

$$g_0 = dgg_7 \quad g_1 = dgg_{15}$$
$$g_2 = dgg_{23} \quad g_3 = dgg_{31}$$
$$p_0 = dgp_7 \quad p_1 = dgp_{15}$$
$$p_2 = dgp_{23} \quad p_3 = dgp_{31}$$
$$c_1 = gc_8 \quad c_2 = gc_{16}$$
$$c_3 = gc_{24} \quad c_4 = gc_{32} = \text{carry-out}.$$

Note that the carry-in is also passed through to become gc$_0$.

An adder according to the present technique has been constructed in CMOS 2-level metal technology having 0.75 micron effective channel length for both p-channel and n-channel transistors, using the MODL gates as shown above. It has demonstrated 32-bit addition times of less than 3.1 nanoseconds at 25 degrees C., with $V_{DD}=5.0$ volts. This high speed is due in part to the reduction of logic levels along the logical critical path. That is, a typical prior-art 32-bit CLA adder has seven logic gate delays, but the present technique allows for only five logic gate delays along the critical path.

While the use of the MODL circuitry is very advantageous for high performance and efficient use of integrated circuit chip area, other circuit techniques and technologies are possible for implementing the present invention. For example, standard "domino" CMOS, "zipper" CMOS, and bipolar technologies are possible, as well as those based on III-V materials (e.g., gallium arsenide), among others.

Although the present carry look-ahead technique has been illustrated above with an adder embodiment, it may be applied to other types of circuits as well, including arithmetic units and arithmetic logic units. These units make use of the basic adder circuitry for also performing subtractions and other arithmetic and logic functions. It is apparent that the present technique may be advantageously used for circuits having data path widths that are multiples of 32. For example, a 128 bit wide circuit is considered to be four 32-bit circuits for the purposes of the present invention.

What is claimed is:

1. A circuit including 32-bit carry look-ahead means, comprising data inputs for a first word ($a_i$) and a second word ($b_i$), where $i=0, 1, 2 \ldots 31$, and having a carry-in input, and further comprising:

first means for producing single bit generate terms ($g_i$), and second means for producing single bit propagate terms ($p_i$), where $i=0, 1, 2 \ldots 31$, except $i \neq 3, 7, 11, 15, 19, 23, 27,$ and 31;

third means for producing double bit generate terms ($dg_{i+1}$), and fourth means for producing double bit propagate terms ($dp_{i+1}$), where $i=0, 2, 4 \ldots 30$;

and wherein said first, second, third and fourth means each receive said first and second words from said data inputs;

fifth means for producing group (4 bit) generate terms ($gg_{i+3}$), and sixth means for producing group (4 bit) propagate terms ($gp_{i+3}$), where $i=0, 8, 16,$ and 24;

seventh means for producing double group (8 bit) generate terms ($dgg_{i+7}$), and eighth means for producing double group (8 bit) propagate terms ($dgp_{i+7}$), where $i=0, 8, 16,$ and 24; and, wherein said fifth and seventh means each receive said double bit generate terms from said third means and said double bit propagate terms from said fourth means; and, wherein said sixth and eighth means each receive said double bit propagate terms from said fourth means;

ninth means coupled to said carry-in input, said seventh means, and said eighth means for producing group carry terms ($gc_i$) (for 8-bit blocks), where $i=0, 8, 16$ and 24;

tenth means coupled to said first, second, fifth, sixth and ninth means for producing bit carry terms ($c_i$), where $i=0, 1, 2 \ldots 31$.

2. The circuit of claim 1 wherein said first means for producing single bit generate terms ($g_i$) and said third means for producing double bit generate terms ($dg_{i+1}$) are implemented by the same logic gate.

3. The circuit of claim 1 wherein said second means for producing single bit propagate terms ($p_i$) and said fourth means for producing double bit propagate terms ($dp_{i+1}$) are implemented by the same logic gate.

4. The circuit of claim 1 wherein said fifth means for producing group generate terms ($gg_{i+3}$) and said seventh means for producing double group generate terms ($dgg_{i+7}$) are implemented by the same logic gate.

5. The circuit of claim 1 wherein said sixth means for producing group propagate terms ($gp_{i+3}$) and said eighth means for producing double group propagate terms ($dgp_{i+7}$) are implemented by the same logic gate.

6. The circuit of claim 1 wherein the use of said double group (8 bit) generate terms and said double group (8 bit) propagate terms reduces the number of logic levels as compared to a carry look-ahead circuit that uses only group (4 bit) generate terms and group (4 bit) propagate terms.

* * * * *